United States Patent [19]
Lindberg

[11] Patent Number: 4,589,044
[45] Date of Patent: May 13, 1986

[54] HEAD-CLEANING DISKETTE HAVING JACKET WITH REMOVABLE TAB

[75] Inventor: Terrance D. Lindberg, White Bear Lake, Minn.

[73] Assignee: Minnesota Mining and Manufacturing Company, Saint Paul, Minn.

[21] Appl. No.: 486,404

[22] Filed: Apr. 19, 1983

[51] Int. Cl.⁴ .................... G11B 23/02; G11B 5/41
[52] U.S. Cl. .................... 360/128; 206/444; 360/133
[58] Field of Search .......... 360/128, 133, 137; 206/444, 807; 281/2, 5; 283/105

[56] References Cited

U.S. PATENT DOCUMENTS

| | | | |
|---|---|---|---|
| 3,668,658 | 6/1972 | Flores | 340/174.1 C |
| 3,809,410 | 5/1974 | Johnson et al. | 281/5 |
| 4,106,067 | 8/1978 | Masuyama et al. | 360/137 |
| 4,374,404 | 2/1983 | Davis | 360/133 X |
| 4,503,473 | 3/1985 | Eyler et al. | 360/128 |

*Primary Examiner*—Stuart N. Hecker
*Assistant Examiner*—David J. Severin
*Attorney, Agent, or Firm*—Donald M. Sell; James A. Smith; William L. Huebsch

[57] ABSTRACT

A radially disposed tear-out tab in one panel of the jacket around a magnetic head-cleaning diskette. The tab is removably held in place by wedge-shaped tangs which are removed with the tab. The tab is formed by a punch-and-die process which retains the initial flatness of the panel.

4 Claims, 3 Drawing Figures

HEAD-CLEANING DISKETTE HAVING JACKET WITH REMOVABLE TAB

FIELD OF THE INVENTION

This invention relates generally to the cleaning of magnetic recording heads, and in particular to the jackets for fibrous discs used in cleaning magnetic recording heads in disc drive apparatuses.

DESCRIPTION OF THE PRIOR ART

As described for example in U.S. Pat. No. 4,106,067, diskettes used for cleaning magnetic recording heads in disc drive apparatuses are similar in structure to the magnetic disc assemblies described in U.S. Pat. No. 3,668,658. They comprise a jacket comprising first and second panels of thin paper board or hard polyvinyl chloride plate, joined at the edges and enclosing a rotatable fibrous disc. Central openings in both panels give access to the disc for a driving spindle of a drive apparatus. The second panel has an access opening extending radially of the disc that affords access for the magnetic head in a single head drive apparatus to one surface of the rotating disc, while a pressure pad opposite the head in the drive apparatus rests against the outer surface of the first panel to press the disc against the head. Either the disc is mildly abrasive so that it cleans the head by a mild abrasive action or (preferably) is nonabrasive and is treated with an evaporable liquid solvent so that it cleans the head by a wiping action.

Typically such a diskette is adopted to be modified so that it can clean a pair of opposed heads (instead of one head opposite a pressure pad) that are used in a two head disc drive apparatus, in that it has a tear-out tab in its first panel in a location opposite the access opening in its second panel. The tab is left in place if the diskette is used in drive apparatuses with only one head, but is readily removable to afford use of the diskette in apparatuses with two opposed heads.

Prior art methods of outlining the tear-out tab have involved "kiss cutting" techniques wherein a knife-edged cutting tool is forced against and through the panel of the jacket against a flat supporting anvil surface. The tab is removably retained in place by spaced narrow tangs or connecting isthmuses which are allowed to remain at appropriate intervals between cuts. Pressure of the tool, and upsetting of the stock by the wedging action of the tool, causes surface cupping and protrusion at and adjacent the cut edges, so that when the tab is removed and the diskette is inserted in a double head drive apparatus there is danger of catching and injuring the adjacent delicate magnetic head by the distorted jacket around the opening from which the tab was removed. Also, after removal of the tab, the remaining tang segments frequently shed onto and are carried by the surface of the revolving cleaning disc so that they can scratch the head being cleaned.

SUMMARY OF THE INVENTION

The present invention provides a tear-out tab in a jacket for a cleaning disc that is formed without disturbing the initial surface flatness of the jacket panel, and is removably held in place by wedge-shaped tangs which are almost completely removed with the tab to restrict shedding of the remaining tang segments on the panel.

According to the present invention there is provided a head-cleaning diskette comprising a revolvable fibrous cleaning disc, and a jacket having first and second panels disposed on opposite side surfaces of the disc and having central openings affording access to the cleaning disc, the first panel having spaced open (e.g., 0.08 cm wide) through slots defining a removable tear-out tab disposed radially of the disc and being supported in the plane of the panel by wedge-shaped tangs between the slots, the wider ends of the tangs being at the tab. The tear-out tab is preferably formed by a method comprising the steps of immobilizing the first panel against a die; and cleanly punching narrow strips from the panel to define the slots, the tear-out tab, and wedge-shaped tangs between the slots attaching the tab to the rest of the panel, with the wider ends of the tangs being at the tab.

BRIEF DESCRIPTION OF THE DRAWING

The present invention will be further described with reference to the accompanying drawing wherein like numbers refer to like parts in the several views and wherein.

DESCRIPTION OF THE PREFERRED EMBODIMENT

Figure 1:
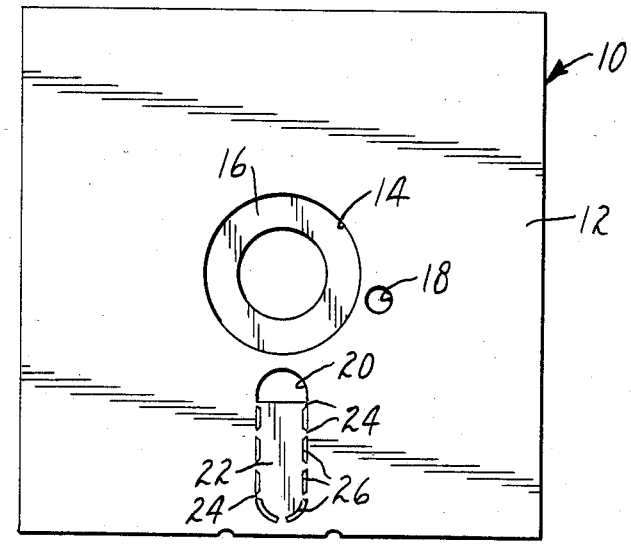
FIG. 1 is a plan view of a head-cleaning diskette including a jacket having a removable tab according to the present invention.

Referring now to the drawing there is shown a head-cleaning diskette 10 including a jacket 11 in which is formed a removable tear-out tab 22 according to the present invention. The jacket 11 comprises a first panel 12 with a circular central opening 14 exposing a central portion of a centrally perforate fibrous cleaning disc 16 within the jacket 11, a small circular opening 18 spaced from the central opening 14 which provides for indexing, a semi-circular access opening 20 also spaced from the central opening 14, and a plurality of spaced open through slots 26 outling the tab 22, which tab 22 extends radially outwardly along the disc 16 away from the access opening 20 and remains attached to the rest of the first panel 12 by wedge-shaped tangs 24 while being otherwise separated from the rest of the first panel 12 by the slots 26. Also included in the jacket 11 is a second panel, not shown, which second panel is fastened to the first panel 12 along all four outer edges to enclose the disc 16.

The edges of the wedge-shaped tangs 24 are at approximately right angles to each other, with the width of each tang 24 decreasing from its juncture with the tab 22 to its juncture with the rest of the first panel 12. As presently preferred, each tang 24 has a width of about 0.045 inch at its juncture with the rest of the first panel 12, and the slots 26 are about 0.032 inch wide, the panel being hard polyvinyl chloride of 0.010 inch thickness. One tang 24 is centered at an outer rounded end of the tab 22.

Figures 2, 3:
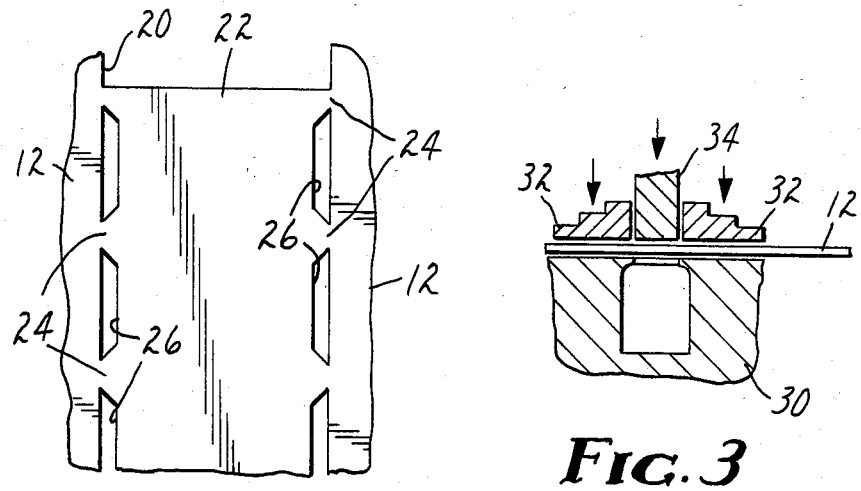
FIG. 2 is an enlarged fragmentary plan view of the tab of FIG. 1.
FIG. 3 is a fragmentary schematic sectional elevation illustrating an apparatus and process used in forming the tab of FIG. 1.

FIG. 3 illustrates the apparatus and process employed in forming the tear-out tab 22. The panel 12 is first clamped closely adjacent the work area between a fixed die 30 and movable holding pads 32. A close-fitting punch 34 is then driven against and through the first panel 12. A portion of the first panel 12 is cleanly cut away, forming one of the sharply outlined slots 26.

Because of the firm anchorage provided by pads 32, no distortion is produced in the tab 22 or the rest of the first panel 12. The jacket 11 of the finished diskette 10 thus remains flat after the tab 22 is removed, and is fully capable of being slid past a magnetic head in a drive apparatus without injury thereto.

When desired, the tab 22 is easily removed from the first panel 12 of the jacket 11 by hand stripping, access to the inner end of the tab 22 being had through the access opening 20. The tangs 24 separate from the rest of the first panel 12 at their narrowest point and are substantially completely removed with the tab 22, leaving few projecting segments to shed or be pulled away onto the surface of the revolving disc 16.

I claim:

1. A head-cleaning diskette comprising a revolvable fibrous cleaning disc, and a jacket having first and second panels disposed on opposite side surfaces of said disc and having central openings affording access to said fibrous cleaning disc, said first panel having spaced open through slots wider in the plane of said panel than the thickness of said panel and defining a tear-out tab disposed radially of said disc and being supported in the plane of said first panel by wedge-shaped tangs between said slots, the wider ends of said tangs being attached to and facing into said tear-out tab and the narrow ends of said tangs facing out of and being opposite the tear-out tab so that removal of the tear-out tab will cause separation of the tangs from the rest of said first panel at said narrow ends leaving few segments of the tangs that can shed and be pulled away onto the surface of the cleaning disc when it is revolved to clean a head.

2. A diskette according to claim 1 wherein said tab has a rounded outer end, and one of said tangs is centered at said outer end.

3. A diskette according to claim 2 wherein the panels are of hard polyvinyl chloride about 0.025 centimeter thick, the width of said slots in the plane of said panel is about 0.08 centimeter, and the width of each tang is about 0.045 inch at its end opposite the tear-out tab.

4. A method for forming a tear-out tab in the jacket of a head-cleaning diskette which jacket includes flat panels, said method comprising the steps of immobilizing one of the panels against a die and cleanly punching narrow strips from the immobilized panel to define slots around the tear-out tab which slots are wider in the plane of the panel than the thickness of the panel, and wedge-shaped tangs between the slots attaching the tab to the rest of the panel, with the wider ends of the tangs being attached to and facing into the tab and the narrow ends of the tangs facing out of being opposite the tear-out tab so that removal of the tear-out tab will cause separation of the tangs from the rest of said first panel at said narrow ends leaving few segments of the tangs that can shed and be pulled away onto the surface of a cleaning disc revolved within the jacket to clean a head.

* * * * *